(12) United States Patent
Amigo

(10) Patent No.: US 8,484,056 B2
(45) Date of Patent: Jul. 9, 2013

(54) SYSTEM AND METHOD FOR INCREASING CAPACITY IN AN INSURANCE SYSTEM THROUGH CAPITAL MARKET PARTICIPATION IN CELL COMPANY BASED ALTERNATIVE RISK TRANSFER STRUCTURE

(75) Inventor: Andrew J. Amigo, Essex, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/536,568

(22) Filed: Jun. 28, 2012

(65) Prior Publication Data
US 2012/0271663 A1    Oct. 25, 2012

Related U.S. Application Data

(63) Continuation-in-part of application No. 13/408,765, filed on Feb. 29, 2012, which is a continuation of application No. 13/022,252, filed on Feb. 7, 2011, now Pat. No. 8,135,600, which is a continuation of application No. 12/059,169, filed on Mar. 31, 2008, now Pat. No. 7,885,835.

(51) Int. Cl.
*G06Q 40/00*    (2006.01)

(52) U.S. Cl.
USPC .................................................. 705/4; 705/3

(58) Field of Classification Search
USPC ........................................................ 705/3–44
See application file for complete search history.

(56) References Cited

U.S. PATENT DOCUMENTS

| | | | |
|---|---|---|---|
| 4,831,526 A | 5/1989 | Luchs et al. | |
| 5,806,042 A | 9/1998 | Kelly et al. | |
| 5,873,066 A | 2/1999 | Underwood et al. | |
| 6,049,773 A * | 4/2000 | McCormack et al. | 705/4 |
| 7,080,020 B1 * | 7/2006 | Klaus | 705/4 |
| 7,089,191 B2 | 8/2006 | Baron et al. | |
| 7,249,038 B2 | 7/2007 | Luedtke | |
| 7,359,875 B1 | 4/2008 | Millette et al. | |
| 7,461,007 B2 | 12/2008 | Lundegren | |
| 7,685,007 B1 | 3/2010 | Jacobson | |
| 7,693,731 B1 | 4/2010 | Weber et al. | |
| 7,742,966 B2 | 6/2010 | Erlanger | |
| 7,885,835 B2 * | 2/2011 | Amigo et al. | 705/4 |
| 7,925,523 B1 | 4/2011 | McConnell et al. | |
| 8,135,600 B2 * | 3/2012 | Amigo et al. | 705/4 |
| 2006/0242052 A1 | 10/2006 | Long et al. | |
| 2007/0282641 A1 | 12/2007 | Thomas et al. | |

OTHER PUBLICATIONS

"Bank One Puts Mortgage Insurance Unit In Gear," CFO Alert, New York: Feb. 8, 1999, vol. 1, Iss. 02: p. 1.
Jody Shenn, "Where's Mortgage Risk? New Answers Emerging," American Banker, New York, NY: May 11, 2005, vol. 170, Iss. 90, p. 1.
Sarah Veysey, "Lloyd's eyes quota-shre limits," Business Insurance, Chicago: Aug. 25, 2003, vol. 37, Iss. 34: p. 13.

* cited by examiner

*Primary Examiner* — Frantzy Poinvil
(74) *Attorney, Agent, or Firm* — Ference & Associates LLC

(57) ABSTRACT

The invention relates, in various aspects to systems, methods, and computer readable media suited for implementing a commonly administered, quota share-based multi-insurer primary insurance system. Among other embodiments, at least one insurance entity is associated with a funding entity, and portions of a claim liability or a received premium associated with at least one insurance policy are allocated among at least two insurance entities and the funding entity according to the stored quota share rates associated with the at least one insurance policy. Other embodiments are disclosed and encompassed herein.

25 Claims, 13 Drawing Sheets

SYSTEM AND METHOD FOR INCREASING CAPACITY IN AN INSURANCE SYSTEM THROUGH CAPITAL MARKET PARTICIPATION IN CELL COMPANY BASED ALTERNATIVE RISK TRANSFER STRUCTURE

CROSS-REFERENCE TO RELATED APPLICATIONS

This application is a continuation-in-part of U.S. patent application Ser. No. 13/408,765, entitled "System and Method for Increasing Capacity in an Insurance System," filed on Feb. 29, 2012, which itself is a continuation of U.S. patent application Ser. No. 13/022,252, now U.S. Pat. No. 8,135,600, entitled "System and Method for Increasing Capacity in an Insurance System," filed on Feb. 7, 2011, and which itself is a continuation of U.S. patent application Ser. No. 12/059,169, now U.S. Pat. No. 7,885,835, entitled "System and Method for Increasing Capacity in an Insurance System", filed on Mar. 31, 2008, the entire contents of each are hereby incorporated by reference.

BACKGROUND OF THE INVENTION

Quota sharing refers to an insurance arrangement in which multiple insurers share the revenue and liabilities associated with insurance policies. Quota sharing has been used in reinsurance to reduce the risk portfolios of policies pose to individual primary insurers. For example, a reinsurer, in return for half the premiums received for a portfolio of policies, may agree to reimburse the primary insurer for half the costs arising from claims related to any of the policies in the portfolio. The portion of revenues and liabilities assumed by the reinsurer is referred to as a quota share rate.

In other situations, reinsurers have broken down portfolios of policies into segments and have agreed to different quota share rates for different segments of the portfolios. In both of these cases, however, the primary insurer is fully liable to the insured for all claims. As far as the customer is concerned, there is only a single insurer.

One challenge facing certain members of the insurance industry is a shortage of capacity. In order to take on new business, insurers need to maintain sufficient capital to handle potential losses. Lack of capacity leads to inefficiencies in the industry due to duplicative administration costs arising from customers seeking multiple tiers of insurance to fulfill their insurance needs.

Other insurers may have extra capacity with which they want to diversify their exposure without becoming subject matter experts in a particular industry. In addition, other capital holders outside of the insurance industry could contribute their capital to the insurance industry, but lack the expertise, systems, and/or desire to administer insurance policies.

Thus, a need exists in the art for systems and methods that would allow insurers to increase their capacity while keeping administration costs low.

Additional, it is recognized that increasing capacity for insurers can concomitantly increase their exposure to liability. Accordingly, needs have also been recognized in connection with increasing capacity while minimizing or forgoing added liability.

SUMMARY OF THE INVENTION

A system providing common administration of quota shared primary insurance policies addresses this need. More particularly, by having multiple primary insurers issue single insurance policies, with each insurer assuming joint but not several liability for claims related to such policies, additional capital can be leveraged without incurring commensurate increases in overhead. In addition, participants in such a system can avoid exposing themselves to risks they deem undesirable by having the system assign quota share rates among participating insurers on a policy-by-policy basis. In this fashion, participants can limit or entirely avoid participating in policies that fail to fit within their desired risk profiles.

In addition, as each insurer is severally, but not jointly, liable for losses, participating insurers can settle claims collectively, or individually. For example, if one participating insurer believes a claim should be challenged while another believes challenging a claim would not be cost-efficient, each can take the action they deem appropriate without implicating the liabilities of the other.

The invention relates, in various aspects to systems, methods, and computer readable media suited for implementing a commonly administered, quota share-based multi-insurer primary insurance system. According to one aspect, the invention relates to a data processing system that includes a memory and a processor in communication with the processor.

The memory stores quota share rates for at least two insurers in association with respective ones of a plurality of insurance policies. In one embodiment, the memory stores, for each of the plurality of insurance policies, at least three policy numbers. One of the policy numbers refers to the insurance policy as a whole, and the remaining policy numbers refer to respective assigned shares of the insurance policy among at the least two insurers.

The processor is configured to assign the quota share rates to each of the respective insurance policies on a policy-by-policy basis. In one embodiment, the processor is configured to determine the quota share rates to assign to each of the respective insurance policies. The determination, in various implementations, may be based on several factors, including underwriting guidelines of each of the insurers, the insurance capacity of each of the insurers, a length of time a respective insurance policy has been in force, and/or a length of time of a relationship among at least two of the insurers. In an alternative embodiment, the system includes a user interface for accepting manual entry of quota share rates.

The processor also allocates portions of claim liabilities or premium revenues associated with each of the policies among the at least two insurers according to the stored quota share rates associated with the policy. Based on the allocation, the processor outputs a fund transfer amount. The processor may also output insurance quotes.

In embodiments in which the processor is configured to allocate portions of received premiums among multiple insurers, the fund transfer amount is a portion of the premium received in relation to a policy that is to be transferred to one of the insurers based on the quota share rate associated with that insurer for that policy. In some implementations, the premiums received in relation to a given policy may be allocated among two, three, or more insurers. The processor may further be configured to initiate a deposit into an account associated with at least one of the insurers based on the fund transfer amount.

In embodiments in which the processor is configured to allocate portions of the liability among at least two insurers, the funds transfer amount is a portion of a claim liability allocated to at least one of the at least two insurers based on the quota share rate associated with the at least one insurer and the policy. In one embodiment, the processor is configured to generate a report for at least one of the insurers including a total of claim liabilities allocated to the insurer. In another embodiment, the processor is configured to initiate a payment from an account associated with one of the at least two insurers to a claimant based on the fund transfer amount.

According to another aspect, the invention relates to a computer readable medium that stores computer executable instructions. Upon execution on a processor, the computer executable instructions cause the processor to carry out a method of administering a plurality of insurance policies. The method includes assigning quota share rates for at least two insurers to each of the respective insurance policies and storing the assigned quota share rates in a memory. The method further includes allocating portions of a claim liability or a received premium associated with at least one of the insurance policies among the at least two insurers according to the stored quota share rates associated with the at least one insurance policy. In addition the computer executable instructions cause the processor to output a fund transfer amount based on the allocation.

According to another aspect, the invention relates to a method of administering a plurality of insurance policies. The method includes assigning quota share rates for at least two insurers to each of the respective insurance policies and storing the assigned quota share rates in a memory. The method further includes allocating portions of a claim liability or a received premium associated with at least one of the insurance policies among the at least two insurers according to the stored quota share rates associated with the at least one insurance policy. The method then includes outputting a fund transfer amount based on the allocation.

According to another aspect, the invention relates to a data processing system for allocating one or more items associated with an insurance policy to multiple entities. The system includes a memory for storing data relating to allocation guidelines for at least two insurance entities in association with at least one insurance policy. The system also includes a processor in communication with the memory configured for allocating portions of a claim liability or a received premium associated with the at least one of the insurance policy among the at least two insurance entities according to the stored data relating to allocation guidelines. The processor is further configured for allocating portions of a claim liability or a received premium associated with the at least one insurance policy to a funding entity associated with at least one of the insurance entities, the funding entity including one or more cell units. The processor is then configured to output a fund transfer amount based on the allocation.

According to another aspect, the invention relates to a data processing system associated with an insurance entity for allocating one or more items associated with an insurance policy to a funding entity for the insurance entity. The system includes a memory for storing data relating to allocation guidelines in association with at least one insurance policy. The system further includes a processor in communication with the memory configured for associating the insurance entity with the funding entity, the funding entity including one or more cell units. The processor is further configured for receiving an allocated portion of a claim liability or a received premium associated with the at least one of the insurance policy among the insurance entity and at least one other insurance entity. The processor is also configured for allocating at least one portion of a claim liability or a received premium associated with the at least one of the insurance policy to the one or more cell units. The processor is then configured to output a fund transfer amount based on the allocation.

According to another aspect, the invention relates to a computerized method for allocating one or more items associated with an insurance policy to multiple entities. The method includes storing, in memory, data relating to allocation guidelines for at least two insurance entities in association with at least one insurance policy. The method further includes allocating by a processor portions of a claim liability or a received premium associated with the at least one of the insurance policy among the at least two insurance entities according to the stored data relating to allocation guidelines. The method additionally includes further allocating by the processor portions of a claim liability or a received premium associated with at least one of the insurance policies to a funding entity associated with at least one of the insurance entities, the funding entity including one or more cell units. The method then includes outputting a fund transfer amount based on the allocation.

According to another aspect, the invention relates to a computerized method for allocating one or more items associated with an insurance policy to a funding entity for an insurance entity. The method includes storing, in memory, data relating to allocation guidelines in association with at least one insurance policy. The method further includes associating, by a processor, the insurance entity with the funding entity, the funding entity including one or more cell units. The method additionally includes receiving, by a processor, an allocated portion of a claim liability or a received premium associated with at least one of the insurance policies among the insurance entity and at least one other insurance entity. The method still further includes allocating by a processor at least one portion of a claim liability or a received premium associated with the at least one insurance policy to the one or more cell units. The method then includes outputting a fund transfer amount based on the allocation.

BRIEF DESCRIPTION OF THE DRAWINGS

The invention may be better understood from the following illustrative description with reference to the following drawings.

DESCRIPTION OF CERTAIN ILLUSTRATIVE EMBODIMENTS

To provide an overall understanding of the invention, certain illustrative embodiments will now be described, including systems and methods for implementing a commonly administered, quota share-based multi-insurer primary insurance program. However, it will be understood by one of ordinary skill in the art that the methods and systems described herein may be adapted and modified as is appropriate for the application being addressed and that the systems and methods described herein may be employed in other suitable applications, and that such other additions and modifications will not depart from the scope hereof.

Figure 1A:
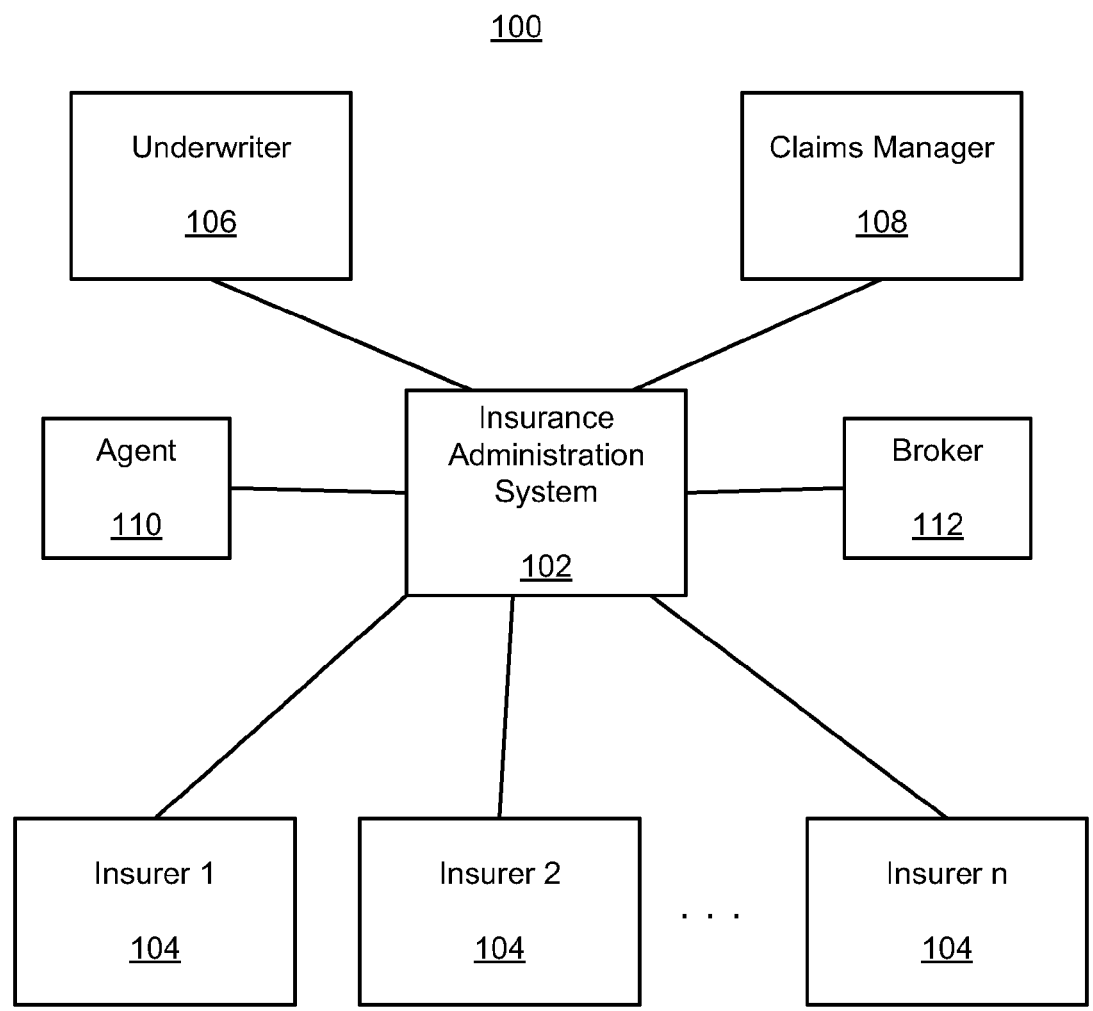
FIG. 1A is a block diagram of a system for insuring customers, according to an illustrative embodiment of the invention.

FIG. 1A is a block diagram of a system 100 for insuring customers, according to a illustrative embodiment of the invention. The system includes an insurance administration system 102, multiple insurers 104, an underwriter 106, a claims adjuster 108, an insurance agent 110, and an insurance broker 112. The insurance administration system 102 serves as an independent service provider to the insurance providers 104 in administering insurance policies for which at least two of the insurers 104 share received premiums and primary responsibility for claims. The functionality of the insurance administration system 102 is described further in relation to FIGS. 2 and 4-6.

The insurance administration system 100 utilizes an underwriter 106 for underwriting new and renewal policies and a claims adjuster 108 for evaluating claims related to administered policies. The underwriter 106 and claims adjuster 108, in one embodiment, are not affiliated with any of the insurers 104. In other embodiments, the underwriter 106 and claims adjuster 108 are affiliated with one of the insurers 104. In still other embodiments, the insurance administration system includes multiple underwriters 106 and/or claims adjusters 108. In these embodiments, one or more of the underwriters 106 and/or claims adjusters 108 are affiliated with one or more of insurers 104. Still other underwriters 106 and claims adjusters 108 may be fully independent.

The insurance agent 110 and insurance broker 112 may also be affiliated with one or more of the insurers 104, or they may be independent. The insurance agent 110 and broker 112 provide business opportunities to insurance administration system 102. The insurance administration system 102 can then offer a quote for insurance coverage to be shared by one or more combinations of at least two of the insurers 104. The insurers 104 grant the insurance administration system 102 the authority to bind them to policies offered through the insurance administration system 102 so long as the insurance administration system 102 applies underwriting guidelines approved by the respective insurers 104. As a result, if a customer accepts a quote presented by the insurance administration system 102, the insurance administration system 102 can bind the policy for the insurers 104 to issue.

The insurers 104, underwriter 106, claims adjuster 108, agent 110, and broker 112 may communicate with the insurance administration system 102 via network connections, for example, over the Internet or other public or private wide or local area network.

Figure 1B:
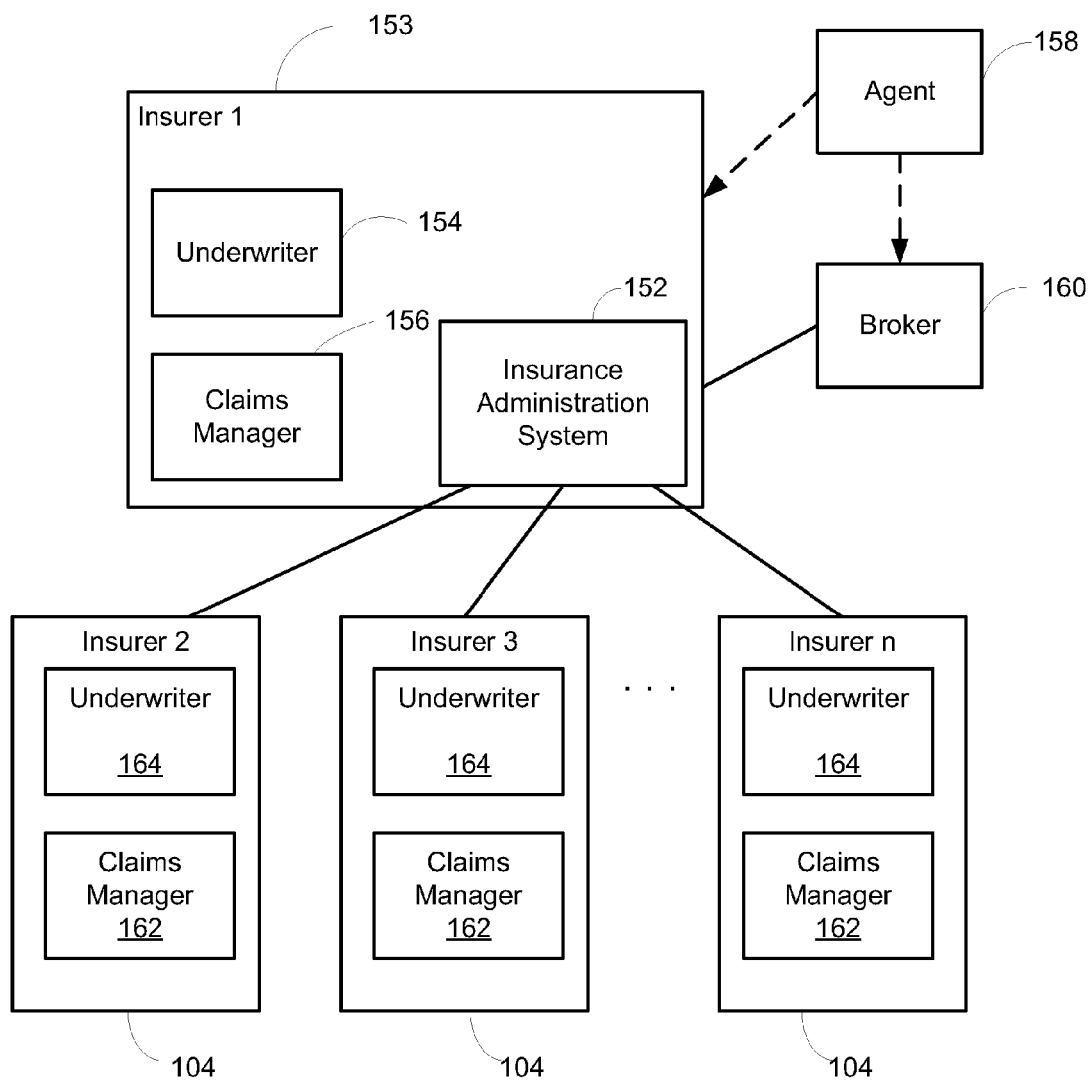
FIG. 1B is a block diagram of a second system for insuring customers, according to an illustrative embodiment of the invention.

FIG. 1B is a block diagram of a second system 150 for insuring customers, according to an illustrative embodiment of the invention. In contrast to the system 100, in the second system 150, an insurance administration system 152 is directly operated by one of the insurers 104, referred to herein as the administering insurer 153. Thus, the insurance administration system 152 primarily utilizes an underwriter 154, a claims adjuster 156, agents 158, and/or brokers 160 directly affiliated with the administering insurer 153. In certain circumstances, for example, if the claims adjuster 156 determines a claim to represent a liability that is greater than a threshold set by one of the non-administering insurers 104, that insurer 104 may utilize an independent claims adjuster or its own claims adjuster 162 to obtain its own evaluation of the claim. Similarly, in underwriting, if the evaluation of a proposed policy by the underwriter 154 affiliated with the administering insurer 153 meets criteria set by one of the non-administering insurers 104, that insurer 104 may have its own underwriter 164 conduct an independent evaluation of the proposed policy. Generally, however, the operation of the insurance administration system 152 is substantially the same as the operation of the insurance administration system 102 of FIG. 1A.

Figure 2:
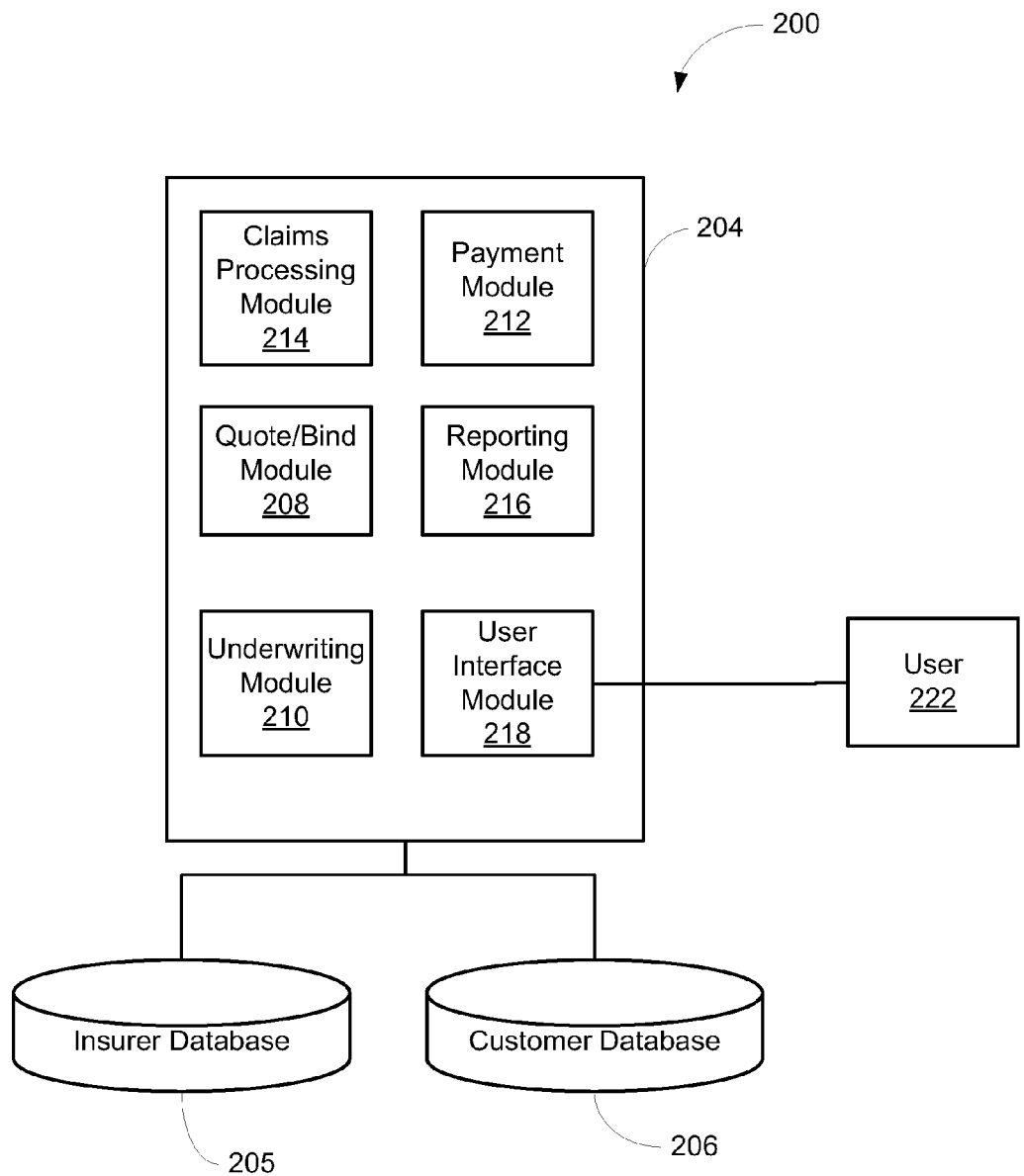
FIG. 2 is a block diagram of an insurance administration system, according to an illustrative embodiment of the invention.

FIG. 2 is a block diagram of an insurance administration system 200, such as the insurance administration systems 102 and 152 of FIGS. 1A and 1B, according to an illustrative embodiment of the invention. The insurance administration system 200 includes an administration application 204, an insurer database 205, and a customer database 206. Together, these components operate to provide common administration of insurance policies for which multiple insurers 104 share premium-derived revenue and jointly, but not severally, share in the liability associated with claims arising in relation to such policies.

The administration application 204 is preferably a software application coded in C, C++, JAVA, or other programming language known in the art. In one embodiment, the administration application includes a Quote/Bind module 208, an underwriting module 210, a payment module 212, a claims processing module 214, a reporting module 216, and a user interface module 218.

The quote/bind module 208 of the administration application 204 is responsible for determining which, if any, of the insurers will share the revenue and liabilities associated with an insurance policy. For a smaller policy, the policy may be issued by only a single insurer. Insurers that share in the revenue and liability associated with a particular insurance policy are referred to herein as "participating insurers." The quote/bind module 208 also determines how the revenues and liabilities will be shared, as well as the total premium to be collected in relation to the policy. Finally, quote/bind module 208 outputs a quote to an agent, broker, employee, or customer including the determined information as an offer for insurance. Upon acceptance of the quote, the quote/bind module 208 binds a policy reflecting the arrangement set forth in the quote.

Figure 3:
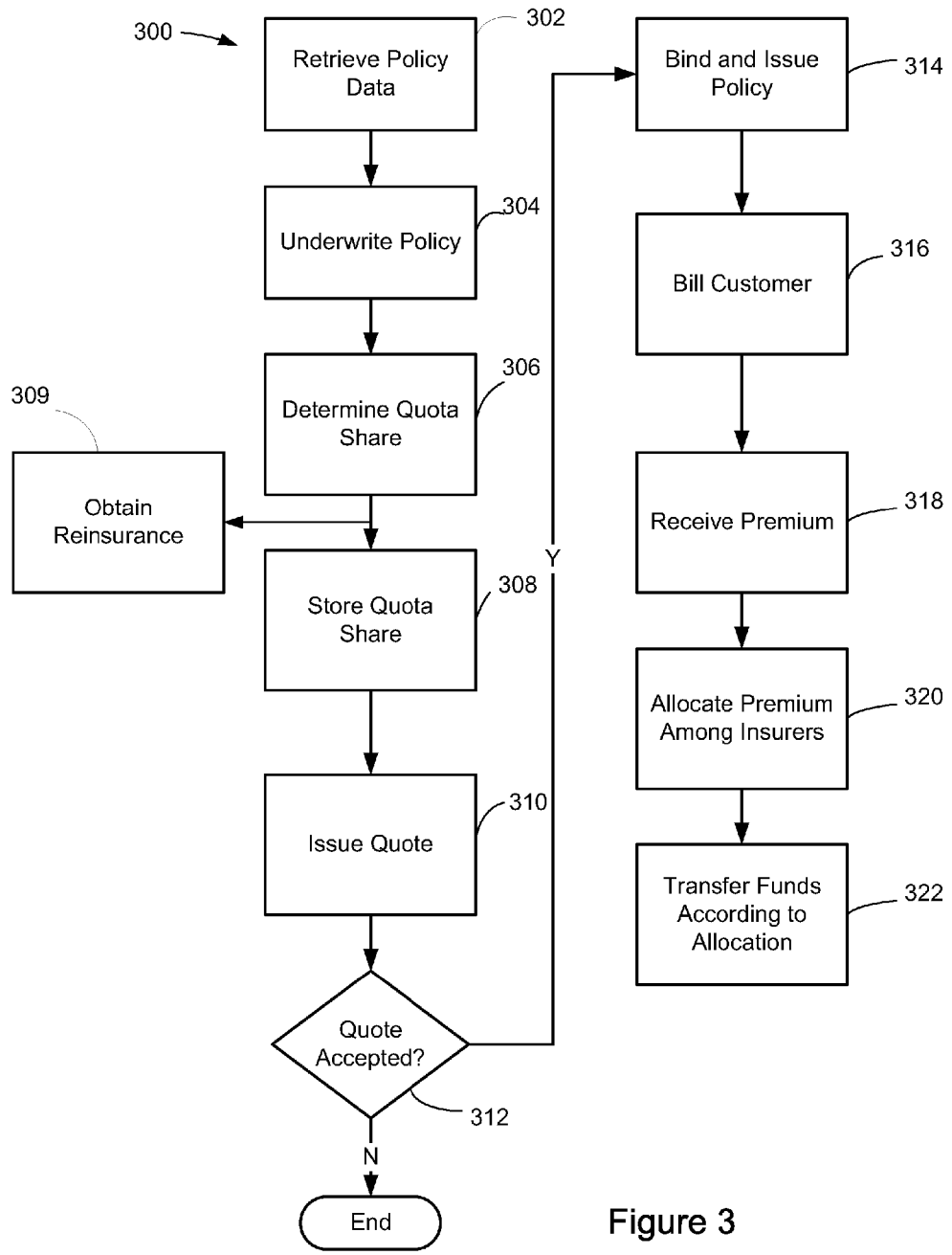
FIG. 3 is a flow chart of a method of binding an insurance policy, according to an illustrative embodiment of the invention.

FIG. 3 depicts a method of binding an insurance policy 300, as may be implemented by the quote/bind module 208 of FIG. 2. The method 300 begins with the quote/bind module obtaining data related to a policy to be quoted (step 302). The policy data may be data related to a newly requested policy, a request for a policy adjustment, or a request to renew an expiring policy. The policy data includes data about the customer, the requested coverages, and associated limits. If the policy is an existing policy with existing quote sharing relationship in place among multiple insurers 104, the policy data also includes the existing quota share rates associated with the policy. The quote/bind module 208 obtains the policy data directly from the customer, from an agent or broker or from the customer database 206.

The quote bind module 208 then underwrites the proposed policy (step 304) by invoking the underwriting module 210. The underwriting module 210 evaluates the proposed policy in light of predetermined underwriting guidelines. Additional details regarding the underwriting process are described further below in relation to FIG. 4.

Assuming that the policy meets the minimum standards for at least one participating insurer, the quote/bind module 208 determines quota share rates (step 306) to apply to the proposed policy. The quote/bind module 208 may determine the quota share rates based on several factors including, in some embodiments, the underwriting results. The following are illustrative examples of how various implementations of the quote/bind module 208 determine the quota sharing rates.

EXAMPLE 1

Relationship Length Quota Share Assignment

In a first illustrative implementation, the quote/binding module 208 determines the quota sharing rates based on the amount of time one of the insurers has been insuring the customer in the proposed policy. This implementation is particularly suitable for use in administration applications 204 operating on insurance administration systems such as insurance administration system 152 of FIG. 1B. In such systems, as the underwriting is carried out by an underwriter associated with the administering insurer 153, the initial risk associated with a policy may be allocated entirely, or mostly, to the administering insurer 153. For example, in the case of a proposed new policy, the quote/binding module 208 assigns 100% of the revenue and risk associated with the new policy to the administering insurer 153. Alternatively, for a new policy, the quote/bind module may assign quota share rates of about 75% to about 95% to the administering insurer 153, and the remaining 5%-25% may be split among one or more non-administering insurers 104. Then, each year, as the policy is renewed, and the risk is better understood, the quote/bind module 208, more evenly distributes quota shares among the insurers sharing the revenue and risk.

EXAMPLE 2

Relative Capacity Quota Share Assignment

In a second illustrative implementation, the quote/binding module 208 determines the quota sharing rates based on the relative capacities of the participating insurers to take on new risk. Based on, e.g., the size, capitalization, and other obligations of an insurer, each insurer may be willing to write varying levels of new business. Consider, for example, insurer A has $25 M in capacity to write, and insurer B has $75 M in capacity. In this scenario, the quote/binding module 208 would assign quota share rates of 25% and 75% to Companies A and B, respectively. Capacity data for each insurer is stored in the insurer database 205.

EXAMPLE 3

Variable Capacity Limit Quota Share Assignment

In a third illustrative implementation similar to the second, insurers maintain capacity limits for certain risk levels. For example, an insurer may maintain a lower capacity for writing higher risk policies than lower risk policies. In such instances, quota share assignments are tied to the output of the underwriting module 210. Alternatively, insurers may set capacity limits based on specific risks. For example, an insurer may set a limit on the coverage it will write for customers located in a particular geographical area, e.g., a specific flood zone, such that a single incident is unlikely to result in overly burdensome losses for that insurer. Similarly, insurers may set capacity levels based on customer business activity. For example, an insurer may set a total liability capacity for insuring chemical companies or construction companies. Based on these distinct capacity limits, the quote/bind module 208 assigns quota share levels among insurers based on their relative capacities to insure the particular risk. If doing so would exceed the capacity of any of the participating insurers, that insurer's participation would be capped at its capacity threshold. Capacity data for each insurer is stored in the insurer database 205.

EXAMPLE 4

Absolute Liability Limit Quota Share Assignment

In a third illustrative implementation, the quote binding module 208 assigns quota share rates according to absolute liability limits set by one or more the participating insurers. Consider the following: Insurer A agrees to share equally in liability for any given policy up to a total of $1 M. Insurer B agrees to take on any necessary share such that together insurers A and B can fully insure a customer. If a customer requests $2 M in coverage, quote/binding module 208 assigns a quota share rate of 50% to insurers A and B. If a customer requests $3 M in coverage, quote binding module 208 assigns quota sharing rates of about 33% and 67% to insurers A and B, respectively. Liability limit data for each insurer is stored in the insurer database 205.

EXAMPLE 5

Variable Liability Limit Quota Share Assignment

This implementation is similar to that of the implementation described in example 3, except that the liability limits for a particular insurer vary based on characteristics of the customer or proposed policy. For example, an insurer may set different liability limits for different rating categories. Thus, the quote/binding module 208 assigns quota share rates at least in part on the output of the underwriting module 210. Liability limits may also be set based on any of the other criteria mentioned in relation to the setting of total capacity limits, described with respect to Example 2. Liability limit data for each insurer is stored in the insurer database 205.

EXAMPLE 6

Manual Input Quota Share Assignment

In an additional implementation, the quota share assignments are made manually by a system user. The system user may set the quota share rates using any of the methodologies described above, or based on other factors including individually negotiated quota sharing arrangements.

The above-described quota share assignment processes may also be combined in a variety of ways without departing from the scope of the invention.

After quota sharing rates are assigned by the quote/bind module 208, the quote/bind module stores the assigned rates in the customer database (step 308). Based on the underwriting and the quota share rate determinations, the quote bind module 208 issues a quote (step 310) for the proposed policy. The quote includes an identification of the participating insurers and their respective quota share rates. In one implementation, the quote is output electronically, for example, via electronic mail or web-based communication, over a network link to a user 222 of the administration application 204. The user 222 may be an insurance agent 110 or 158, an insurance broker 112 or 160, or an insurer employee. Alternatively, the user 222 may be a customer.

If the quote is accepted (at decision block 312), the quote/bind module 208 binds the policy (step 314), initiating a policy issuance process that includes forwarding a copy of a policy to the customer. Upon binding a policy, the quote/binding module 208 opens multiple account records for the bound policy, each with its own policy number. The first record is an administrative record and relates to the policy as a whole. Each additional record relates to a particular participating insurer's share of the policy. As a result, if a participating insurer wishes to adjust a claim for a particular policy independently from other participating insurers, information related to such adjustment can be stored in that in relation to the record corresponding to that insurer's share of the policy. If the quote is rejected (at decision block 312) the method 300 ends, until a revised request for insurance is received.

After a policy is bound (at step 314), the customer is billed for the insurance (step 316). The bill may be issued through an agent 110 or 158. In one implementation, on a regular basis, agents 110 or 158 forward a single payment including the sum of premiums collected for multiple policies administered by the insurance administration system 200. This single payment is accompanied by information indicating which policies the collected premiums are related to. In other implementations, the insurance administration system 200 directly bills (step 316) customers for their respective policies.

Upon the insurance administration system 200 receiving premiums (step 318) associated with one or more policies, the administration application 204 allocates the received premiums among the insurers participating in those policies (step 320) via the payment module 212 on a policy-by-policy basis. Premiums are allocated (step 320) based on the quota share rates associated with the participating insurers. For example, for an insurer which is assigned a 30% quota share rate for a particular policy, the payment module 212 allocates to that insurer 30% of premiums received in relation to that policy. The funds may be deposited in a bank account associated with the insurance administration system 200 prior to allocation among participating insurers. The payment module 212 then transfers funds from the system account to bank accounts maintained for the respective participating insurers (step 322). This fund transfer process, in one implementation, includes electronically outputting a fund transfer amount to a bank along with source account and destination account information.

Figure 4:
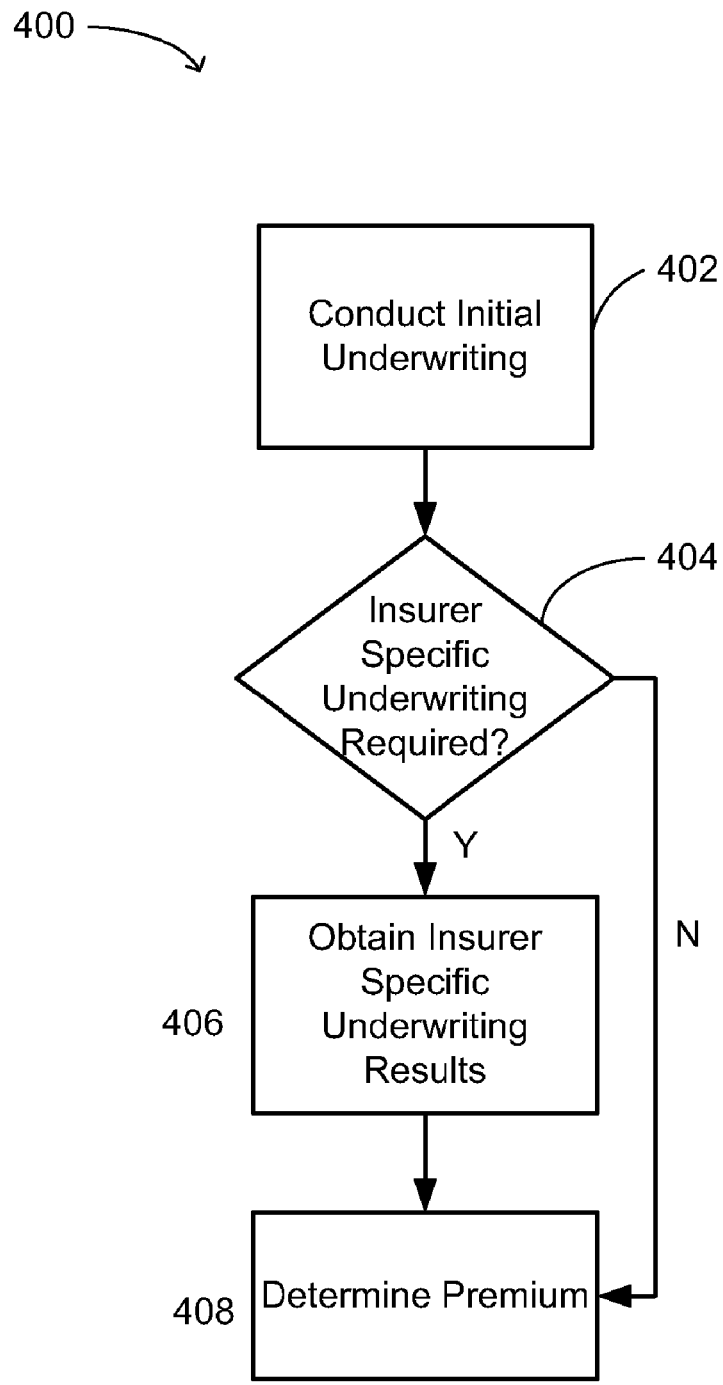
FIG. 4 is a flow chart of a method of underwriting an insurance policy according to an illustrative embodiment of the invention.

FIG. 4 is flow chart of a method of underwriting 400 a proposed insurance policy, as may be carried out by the underwriting module 210 of the administration application 204 of FIG. 2 at step 304 of the method of FIG. 3. While the method 400 is described below in relation to underwriting module 210, the method may also be independently implemented (i.e., outside of the context of an administration application 204) by underwriters engaged to underwrite policies handled by insurance administration systems 102 and 152 of FIGS. 1A and 1B.

Referring to FIGS. 2 and 4, the underwriting method 400 begins with the underwriting module 210 conducting an initial underwriting of a proposed policy (step 402). The underwriting module 210 retrieves information needed to carry out the initial underwriting from the customer database 206.

Based on the retrieved information and the initial underwriting, the underwriting module determines whether any additional underwriting may be required by specific insurers that may desire to participate in the policy (decision block 404). To aid in this determination, insurers participating in the insurance administration system 200 may store insurer specific criteria in the insurer database 205 related to their underwriting preferences. For example, an insurer may set one or "additional underwriting triggers." If the underwriting module 210 determines one or more additional underwriting triggers have been met (at decision block 404), the underwriting module forwards the proposed policy data to an underwriter affiliated with the corresponding insurer to provide further evaluation (step 406). The following are examples of additional underwriting triggers suitable for use by participating insurers.

EXAMPLE 1

Rating Based Triggers

In this example, an insurer sets a rating threshold. If the underwriting module 210 determines that a policy exceeds the rating threshold, the underwriting module 210 forwards the proposed policy data to an underwriter selected by the insurer for further review. Based on this further underwriting, the insurer may decline to participate in the policy, require a different rating to participate, or require different policy parameters (e.g., limits or exclusions) to participate.

EXAMPLE 2

Customer Characteristic Based Triggers

In this example, an insurer identifies specific characteristics, which if a particular customer has one or more of such characteristics, the insurer requires further underwriting to participate. Such characteristics may include geographic location, industry classification, specific loss history characteristics, etc. If the underwriting module 210 determines that customer requesting a proposed policy possesses any of these characteristics, the underwriting module 210 forwards the proposed policy data to an underwriter selected by the insurer for further review. Based on this further underwriting, the insurer may decline to participate in the policy, require a different rating to participate, or require different policy parameters (e.g., limits or exclusions) to participate.

EXAMPLE 3

Policy Characteristic Based Triggers

In this example, an insurer identifies specific policy characteristics to trigger further underwriting. Such characteristics may include liability limit thresholds, deductible thresholds, inclusion of specific coverages, etc. If the underwriting module 210 determines that a requested policy has any of these characteristics, the underwriting module 210 forwards the proposed policy data to an underwriter selected by the insurer for further review. Based on this further underwriting, the insurer may decline to participate in the policy, require a different rating to participate, or require different policy parameters (e.g., limits or exclusions) to participate.

Certain insurers may utilize combinations of the above triggers without departing from the scope of the invention.

Based on the initial underwritings results, and, if needed, any supplemental underwriting required by specific insurers, the underwriting module determines a premium price (step 408) for the proposed policy according to any premium determination process known in the art.

Referring back to FIG. 2, the administration application 204 also includes a claims processing module 214. The claims processing module 214 is responsible for administering claims filed in relation to insurance policies managed by the insurance administration system 200. The functionality of the claims processing module is best understood in relation the method of claim administering 500 depicted in FIG. 5.

Figure 5:
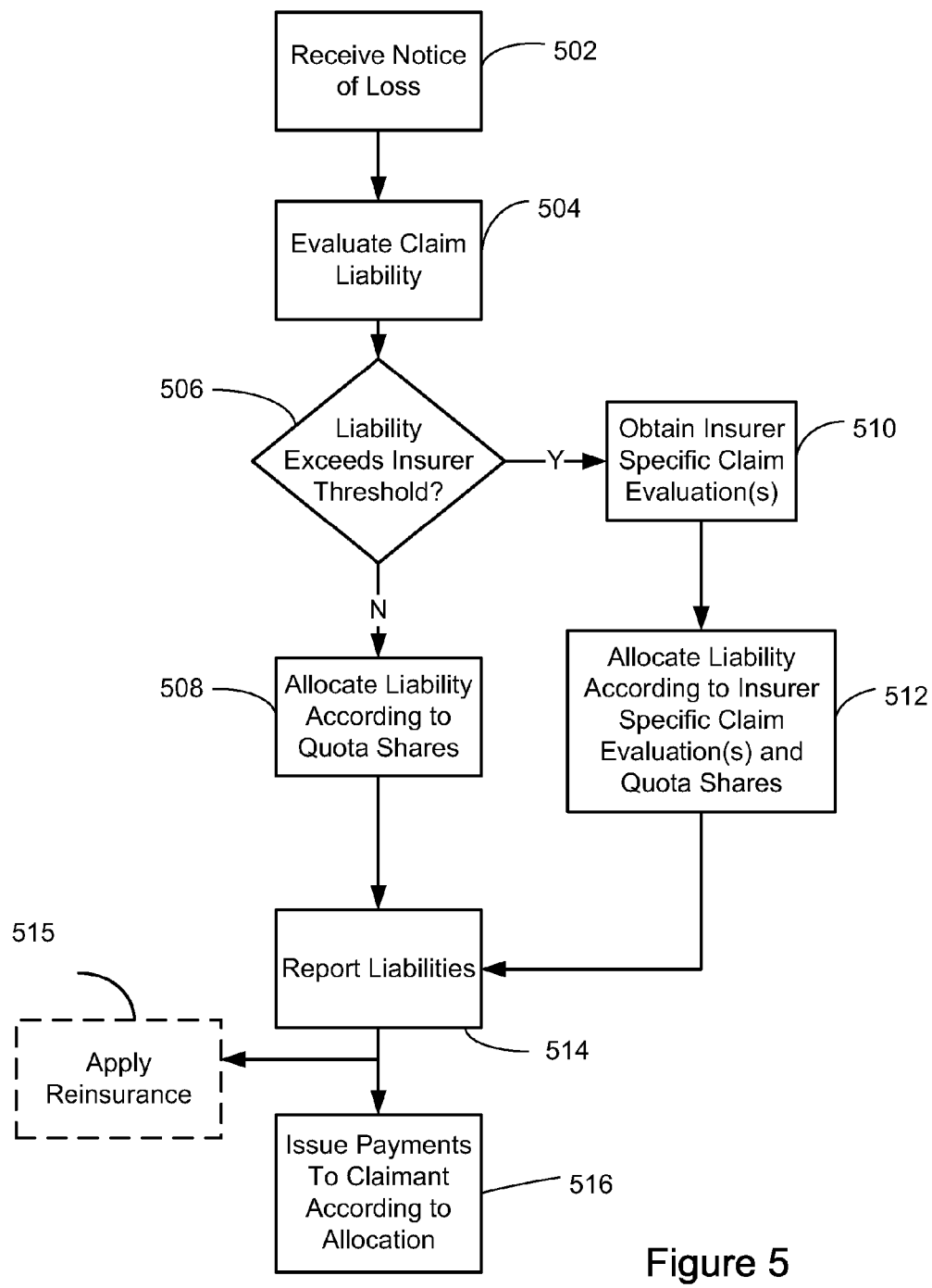
FIG. 5 is a flow chart of a method of claim administration, according to an illustrative embodiment of the invention.

More particularly, FIG. 5 is a flow chart of a claim administration method 500 suitable for implementation by the claims processing module 214, according to an illustrative embodiment of the invention. Referring to FIGS. 2 and 5, the method 500 begins with the insurance administration system 200 receiving a notice of loss associated with a policy administered by the system 200 (step 502). The notice of loss preferably includes preliminary details about the loss and the circumstances surrounding the loss. The claims processing module 214 then forwards the loss information to a claims adjuster to evaluate the claim (step 504). The claims adjuster preferably returns a loss magnitude value as well as data that can be used to verify the veracity of the claim and to determine whether the loss is covered by the policy in question.

Assuming the loss is in fact covered by the policy and there the adjuster fails to find significant indicia of fraud, the claims processing module compares the magnitude of the loss to thresholds set by insurers participating in the policy at decision block 506. Such thresholds may be stored in the insurer database 205. Insurers may store single thresholds, or thresholds that vary based on various parameters, including, for example, the coverage implicated, the type of loss generally (e.g., property versus liability versus bodily injury), or specific type of loss (e.g., soft-tissue injury versus broken bone, etc.) If the magnitude falls below all participating insurer's applicable thresholds, the claims processing module 214 proceeds to allocate the determined liability among the participating insurers based on their respective quota share rates (step 508). For example, if three insurers are participating in a policy with equal quota share rates, and a claims adjuster values a claim at $300,000, each insurer is allocated $100,000 of the liability. The insurers are jointly, but not severally liable for the claim according to their quota share rates. That is, no participating insurer is responsible for more than its quota share rate of the liability. This allows each insurer to settle its portion independently of the remaining participating insurers.

If the claims adjuster's evaluation of the claim exceeds a participating insurer's threshold, the claims processing module 214 forwards the information obtained about the claim to a claims adjuster identified by the insurer for an independent evaluation of the claim (step 510). Based on the initial evaluation and the subsequent insurer specific claim evaluation, the claims processing module 214 allocates the claim liability among the participating insurers (step 512). The allocation to each insurer is based on either the initial evaluation, if the results did not exceed the threshold of that particular insurer, or the insurer's independent claim evaluation and each insurer's respective quota share rate if the initial evaluation surpassed their threshold(s). Consider the following example:

Example Claim Allocation:

Insurers A, B, and C issue a quota shared policy to Customer 1, with respective share rates of 25%, 25%, and 50%, respectively. Customer 1 then notifies the insurance administration system of a loss. The claims adjuster affiliated with the insurance administration system evaluates the claim as a $5 M claim, exceeding the $3 M claim liability threshold of Insurer C. Thus, Insurer C conducts its own claim adjustment. The claims adjuster for Insurer C evaluates the claim as a $4.5 M claim.

The claims processing module 214 then allocates liability to Insurers A, B, and C. As Insurers A and B did not conduct an independent claims evaluation, the claims processing module 214 applies the initial $5 M evaluation in allocating liability, resulting in allocations of $1.25M (25% of $5 M) to both Insurer A and Insurer B. Claims processing module 214 then applies Insurer C's independent claim adjustment in allocating liability to Insurer C. Thus, the claims processing module allocates $2.25 M (50% of $4.5 M) to Insurer C.

The allocation of liability by the claims processing module 214 is then reported (step 514) to the respective insurers. Allocated liability can be reported immediately upon allocation, from time to time, or according to a regular schedule, e.g., monthly. Such allocations can then be used by the insurers to set their reserves. Reports are generated and output by the reporting module 216.

In addition, the claims processing module 214, in conjunction with the payment module 212 can issue payments related to claims (step 516). For example, after allocation of liability, the payment module 214 can output fund transfer amounts associated with each insurer to initiate the printing and sending of checks from accounts associated with the participating insurers based on their allocated liability. Thus, if no liability thresholds are exceeded requiring insurer specific claims adjusting, the insurance administration system 200 can handle a claim from receipt of a notice of loss through claim settlement without the participating insurer needing to intervene at all.

The reporting module 216 generates a variety of reports for participating insurers in addition to the liability reports described above. Example reports include total exposure reports, exposure reports by policy category, and accounting reports. Such reports may be generated automatically according to a schedule or, alternatively, upon request by a user via the user interface 218. Such reports may be output electronically, e.g., to a display or as a electronic communication, or in paper format via a printing device coupled to the system 200.

Figure 6:
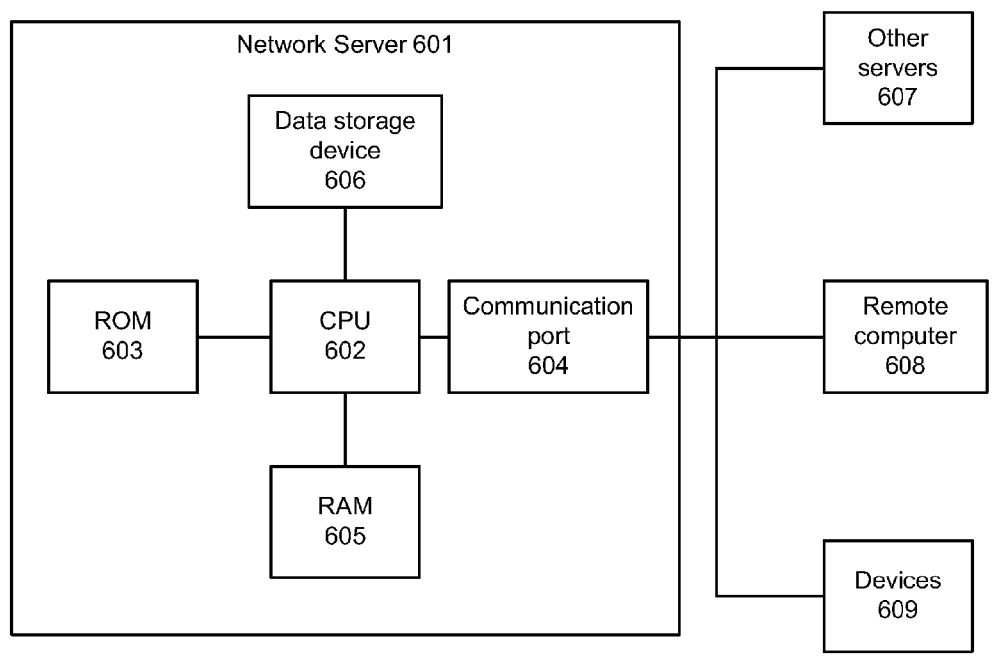
FIG. 6 is a block diagram of a computing architecture suitable for implementation of the insurance administration system of FIG. 2, according to an illustrative embodiment of the invention.

FIG. 6 is a block diagram of a computing architecture suitable for implementing a computing device on which the insurance administration system 200 may be implemented. Computer 601 comprises at least one central processing unit (CPU) 602, at least one read-only memory (ROM) 603, at least one communication port or hub 604, at least one random access memory (RAM) 605, and one or more databases or data storage devices 606. All of these later elements are in communication with the CPU 602 to facilitate the operation of the computer 601. The computer 601 may be configured in many different ways. For example, computer 601 may be a conventional standalone computer or alternatively, the function of computer 601 may be distributed across multiple computing systems and architectures.

Computer 601 may be configured in a distributed architecture, wherein databases and processors are housed in separate units or locations. Some such units perform primary processing functions and contain at a minimum, a general controller or a processor 602, a ROM 603, and a RAM 605. In such an embodiment, each of these units is attached to a communications hub or port 604 that serves as a primary communication link with other servers 607, client or user computers 608 and other related devices 609. The communications hub or port 604 may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 602 comprises a processor, such as one or more conventional microprocessors and one or more supplementary co-processors such as math co-processors. The CPU 602 is in communication with the communication port 604 through which the CPU 602 communicates with other devices such as other servers 607, user terminals 608, or devices 609. The communication port 604 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 602 is also in communication with the data storage device 606. The data storage device 606 may comprise an appropriate combination of magnetic, optical and/or semiconductor memory, and may include, for example, RAM, ROM, flash drive, an optical disc such as a compact disc and/or a hard disk or drive. The CPU 602 and the data storage device 606 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 602 may be connected to the data storage device 606 via the communication port 604.

The data storage device 606 may store, for example, (i) a program (e.g., computer program code and/or a computer program product) adapted to direct the CPU 602 in accordance with the present invention, and particularly in accordance with the processes described in detail with regard to the CPU 602; (ii) databases adapted to store information that may be utilized to store information required by the program. Suitable databases include the insurer database 205 and customer data base 208 of FIG. 2.

The program may be stored, for example, in a compressed, an uncompiled and/or an encrypted format, and may include computer program code. The instructions of the program may be read into a main memory of the processor from a computer-readable medium other than the data storage device 606, such as from a ROM 603 or from a RAM 605. While execution of sequences of instructions in the program causes the processor 602 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as underwriting proposed insurance policies, assigning quota share rates, and allocating claim liability among participating insurers. The program also may include program elements such as an operating system, a database management system and "device drivers" that allow the processor to interface with computer peripheral devices 609 (e.g., a video display, a keyboard, a computer mouse, etc.).

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 602 (or any other processor of a device described herein) for execution. For example, the instructions may initially be borne on a magnetic disk of a remote computer 608. The remote computer 608 can load the instructions into its dynamic memory and send the instructions over an Ethernet connection, cable line, or even telephone line using a modem. A communications device 604 local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 7:
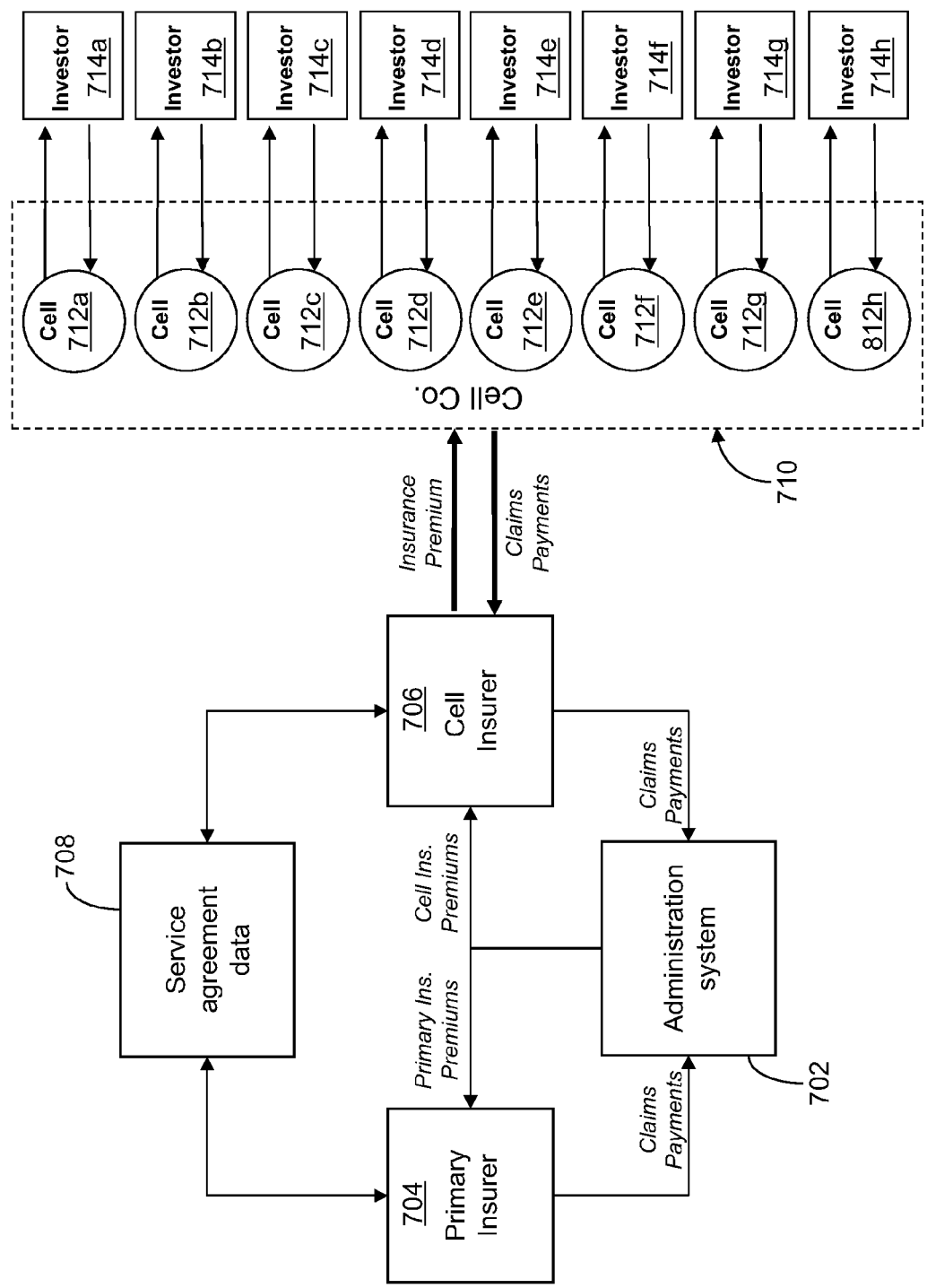
FIG. 7 is a block diagram of a system for insuring customers and concomitantly providing an investment vehicle to investors, according to at least one illustrative embodiment of the invention.

FIG. 7 is a block diagram of a system for insuring customers and concomitantly providing an investment vehicle to investors, according to at least one illustrative embodiment of the invention. In accordance with the present illustrative example, an insurance policy administrator, via an administration system 702 can provide a policy representing a combination quota share with several but not joint liability, e.g., as that described and illustrated herein with respect to embodiments of the invention shown in FIGS. 1-6. As such, insurance premiums are split between a primary insurer 704 and a cell insurer 706 (e.g., 50% apiece), while the insurers 704/706 can establish a service agreement (with associated data 708) for management purposes (e.g., to set rates, provide quotes, and bind, issue and handle claims), thereby avoiding a duplication of management function both between themselves and with the cell company 710 (and components thereof) to be discussed herebelow.

In accordance with at least one embodiment of the invention, a protected cell company 710 is created which owns the cell insurer 706. In at least one embodiment, the cell insurer 706 may be domestic and non-admitted. The cell company 710, for its part, may exist for a singular purpose of funding obligations of the cell insurer 706 under a reinsurance and capital maintenance contract.

In accordance with at least one embodiment of the invention, the cell company 710 is effectively divided into multiple cells 712a-h. While eight cells 712a-h are illustrated in FIG. 7, it is to be understood that essentially any number of cells may exist. The cells 712a-h are created through investment actions of multiple investors 714a-h, in that each investor (as an individual or group of individuals) may buy a desired share portion of the cell company 710 (e.g., 0.2%, 2%, 25%, etc.) that itself would constitute one of the individual cells 712a-h. Each investor 714a-h, for its part, can set up an LLC (Limited Liability Company) for the purpose of making such an investment. Each cell 712a-h can be established in a manner to provide or contribute to a degree of financial strength of the cell insurer 706 that is commensurate with attractiveness in the insurance market. As such, and by way of an illustrative and non-restrictive example, each cell 712a-h can be established as a credit for reinsurance trust. A credit for reinsurance trust is generally qualified under state insurance law, with requirements varying from state to state, or could be qualified in an offshore jurisdiction (where requirements of any corresponding offshore regulator would need to be satisfied). Other secure instruments for establishing a cell 712a-h can include essentially any form of security trust, letters of credit, derivative transactions. Essentially, an objective is to accord a level of comfort to regulators and/or investors commensurate with making an investment in a portion (cell) of a cell company 710 as broadly contemplated herein, to the extent that it serves as a funding instrument for a cell insurer or reinsurer (as broadly contemplated herein).

In that vein, and in accordance with at least one embodiment of the invention in the form of an illustrative and non-restrictive example, each cell 712a-h can be established as a N.Y. Reg. 114 Reinsurance Trust. By way of background information, as noted at http://www.irmi.com/online/insurance-glossary/terms/r/regulation-114-trust.aspx, this term refers to Regulation 114 of the Insurance Department of the State of New York, which details standards for the use of trust funds for reinsurance. As noted there, "when applied to captives, a trust agreement is entered into between the captive, the fronting company, and a bank. The bank acts as the trustee for the fund. The captive deposits cash and/or allowable securities into the trust. The fronting company, as the beneficiary of the trust, must approve the assets in the trust. The fronting company can demand, at any time, assets from the trust to meet the captive's obligations under the reinsurance agreement. The assets are delivered as securities, which are converted to cash by the fronting company. A Regulation 114 trust can be used to collateralize both the loss fund and the risk gap, or used in combination with a letter of credit."

In accordance with at least one embodiment of the invention, it can now be appreciated that primary insurer 704 can increase property capacity while being shielded from additional liability. While the primary insurer 704 can earn fees for all services provided to the cell company 710, liability is assumed solely in the context of each individual cell 712a-h.

Thus, the totality of cells 712a-h can represent varying levels of investment and/or insurance risk, corresponding to what each investor 714a-h wishes to assume.

It can now be appreciated that, in accordance with at least one embodiment of the invention, not only is the issuance of a policy divided between co-issuing insurers, but there is also a further division of interests among investors (714a-h) in one of the co-issuing insurers (here, cell insurer 706). (In this vein, the allocation of assets, premiums and liability to different cells 712a-h can proceed in a manner analogous to the assignment of quota shares between primary and captive insurers.) Broad access is thereby accorded to potential participants through capital markets, in that the cell company 710, in its intermediary role between investors 714a-h and cell insurer 706, obviates a need for each investor to become a regulated insurer. At the same time, compliance with insurance regulations is still ensured with insurance regulations for qualified assets, etc.

It can also now be appreciated that, in accordance with at least one embodiment of the invention, although only one quota share insurer (in this case, cell insurer 706) is allowed onto the insurance policy of the primary insurer 704, multiple sources of capital (i.e., the multiple investors 714a-h) end up being engaged. Investments in the cell company (710) structure can be registered as tradeable securities, converting them into a liquid asset class with a secondary market. Again, the protected structure of cell company 710 can end up accommodating a great number and variety of investors 714a-h, which each assume a fixed (or possibly variable) percentage of risks assumed by the cell insurer 706, while liability associated with each of the cells 712a-h does not affect (or reach to) other cells 712a-h.

It can be appreciated that, with a setup as broadly contemplated herein, in accordance with at least one embodiment of the invention and as shown in FIG. 7, each investor 714a-h can earn interest on its initial investment in cell company 710 (which investment, itself, can be limited to no-risk investments such as treasuries and money market funds), in addition to interest earned on its quota share portion of the insurance premium. Further, by structuring investments in the cell company as purchases of registered securities, investors 714a-h can buy and sell cell ownerships in a secondary market, thereby providing an "exit" to their investment without disrupting the underlying (or associated) insurance.

Figure 8:
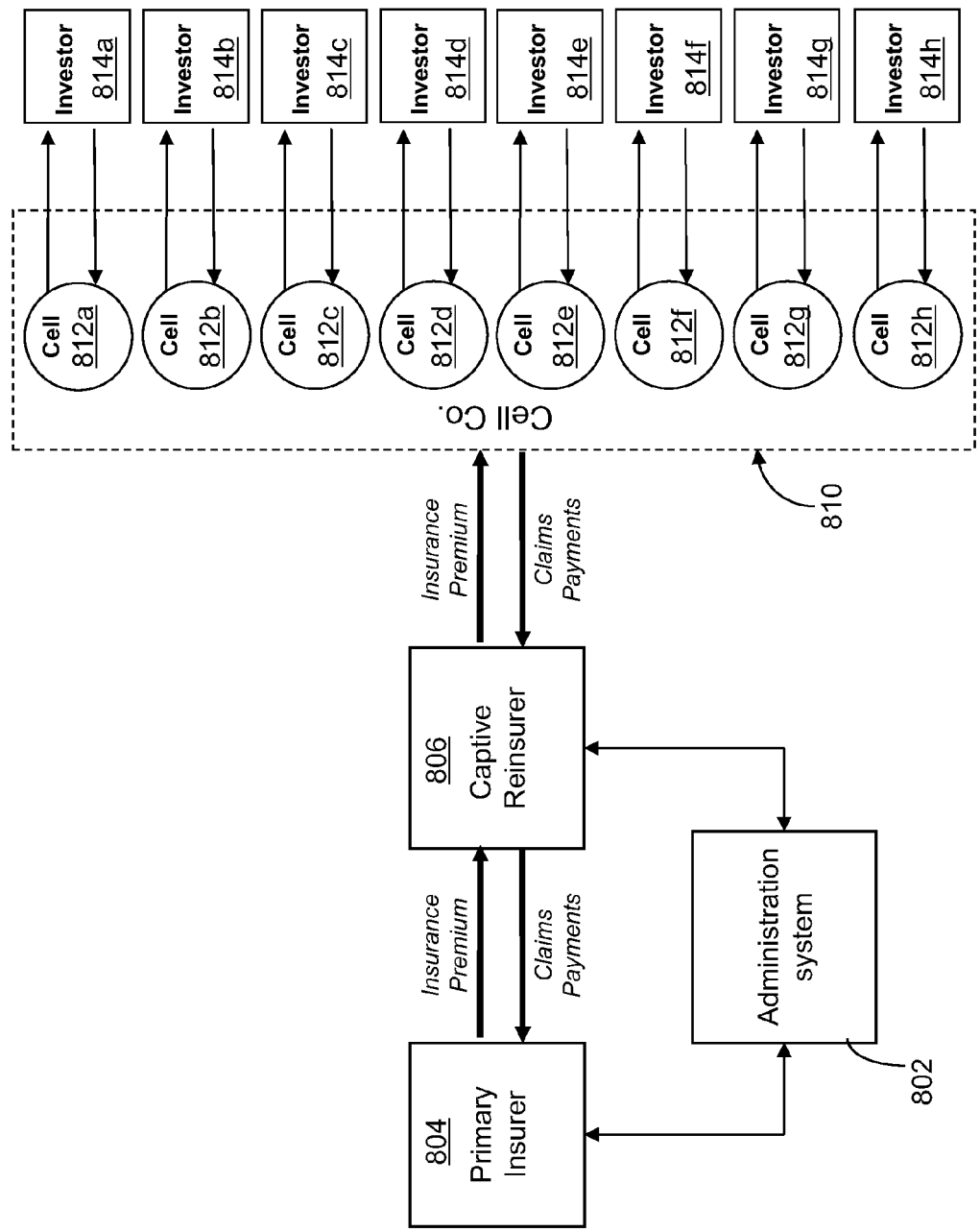
FIG. 8 is a block diagram of a variant system for insuring customers and concomitantly providing an investment vehicle to investors, according to at least one illustrative embodiment of the invention.

FIG. 8 is a block diagram of a variant system for insuring customers and concomitantly providing an investment vehicle to investors, according to at least one illustrative embodiment of the invention. Analogously to the example of FIG. 7, illustrated here also are a primary insurer 804, a cell company 810 with individual cells 812, and investors 814 corresponding to each of the cells 812. Also shown is a policy administration system 802 associated with the primary insurer 804. The cell company 810 and cells 812 can be embodied and structured similarly as described hereinabove with respect to cell company 710 and cells 712a-h of FIG. 7. Here, however, the cell company 810 owns a captive reinsurer 806, which can essentially be established and operate in a manner similar to reinsurers as generally known, wherein a quota share arrangement is not present. In accordance with a variant embodiment, a captive reinsurer 806 can even be established as a precursor or "stepping stone" to establishing a cell insurer (e.g., as indicated at 706 in FIG. 7), whereupon a quota share arrangement (as discussed variously herein) can be included.

Figure 9:
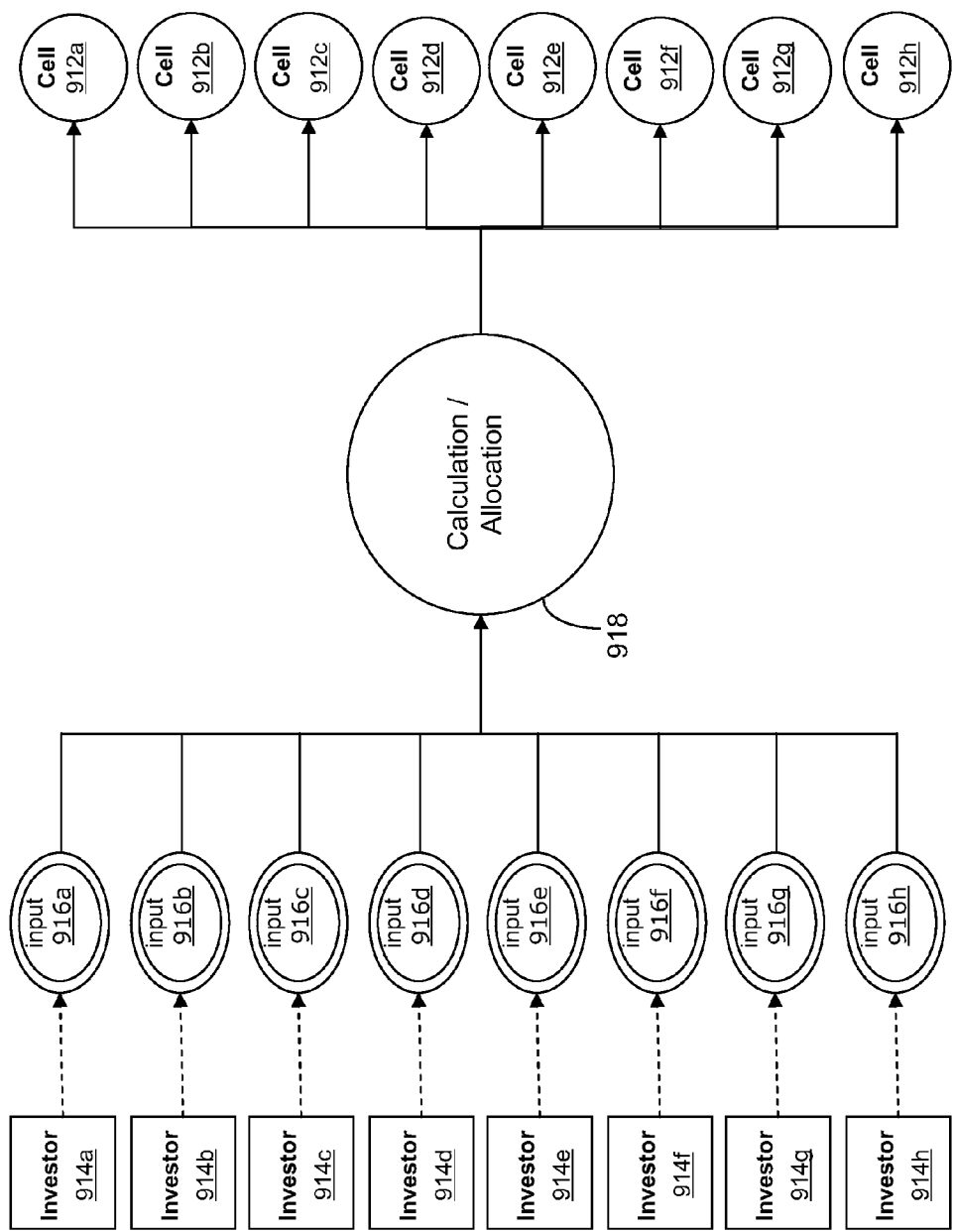
FIG. 9 schematically illustrates a general process for creating cells as shown in FIGS. 7 and 8, according to at least one illustrative embodiment of the invention.

FIG. 9 schematically illustrates a general process for creating cells 912a-h (which may be similar to those indicated at 712a-h and/or 812a-h in FIGS. 7 and 8, respectively), in accordance with at least one embodiment of the invention. Investors 914a-h (which may be similar to those indicated at 714a-h and/or 814a-h in FIGS. 7 and 8 respectively, and may be represented as individuals, groups, or LLCs as discussed variously herein) are accorded an opportunity to enter tangible/quantitative input (916a-h), indicating choices from among a very wide variety of parameters. Such parameters can include a type of insurance (e.g., property, product liability), a specific subset of the same (e.g., property in high-wind or flood-prone zones, new construction, medical devices), all underlining a desire or "appetite" for a level of risk to be assumed. The various submissions of input 916a-h are then forwarded (directly or via a third party such as an agent or broker) to a system 918 which assimilates the input and then consolidates it with other stored information and data, such as available lines of business, underwriting criteria for those lines, financial exposures associated with those lines as well as associated premium price levels. System 918 may be integrated or coincident with an administration system such as that indicated at 702 in FIG. 7 or 802 in FIG. 8.

In accordance with at least one embodiment of the invention, the system 918 then allocates to several cells 912a-h certain defining parameters as touched on hereinabove which may include, but need not be limited to, a represented investment portion of a cell company (such as one indicated at 710 in FIG. 7 or 810 in FIG. 8) and a line of business, with an associated insurance risk and other policy parameters, assumed by the cell. One or more facilities or items (e.g., properties or products) can be associated with each cell 912a-h. The allocation of parameters can proceed in a manner similar to that discussed herein with respect to assigning quota shares (e.g., with respect to FIGS. 1-6), and can be done in two steps, e.g., by first dividing (premiums, assets, liability, etc., as discussed hereinabove) between primary and cell insurers (704 and 706, respectively, in FIG. 7) or between a primary insurer and captive reinsurer (804 and 806, respectively, in FIG. 8) and then effecting a further division (of premiums, assets, liability, etc., as discussed hereinabove) from a cell insurer or captive reinsurer to the cells 912a-h.

Figure 10:
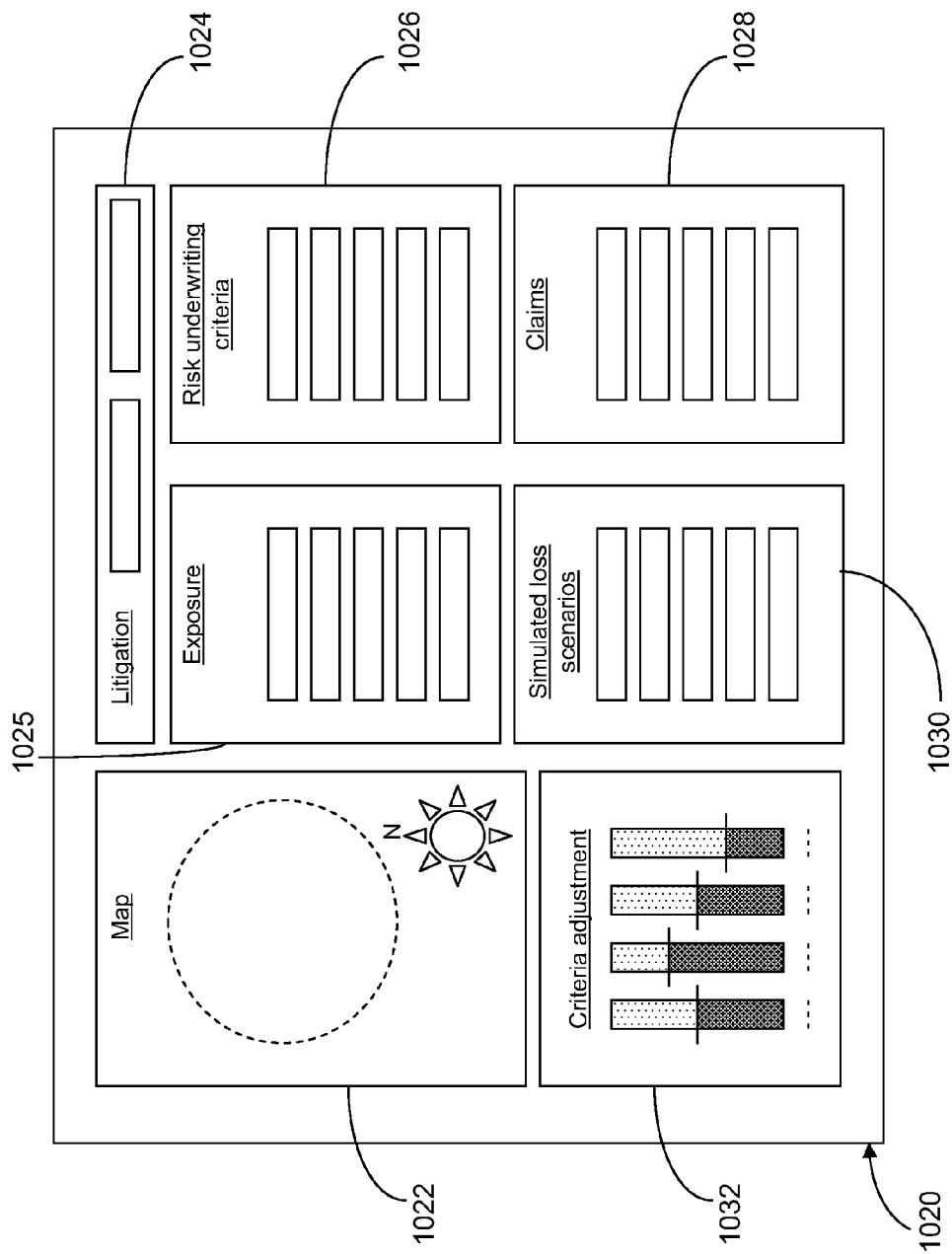
FIG. 10 schematically illustrates an example of a dashboard 1020 that may be made available to an investor for the purpose of providing input as discussed and illustrated with respect to FIG. 9, according to at least one illustrative embodiment of the invention.

FIG. 10 schematically illustrates an example of a dashboard (e.g., in the form of a graphical user interface, or GUI) that may be made available to an investor or other user (such as one of those indicated at 914a-h in FIG. 9) for the purpose of providing input (916a-h) as discussed and illustrated with respect to FIG. 9. As such, the dashboard 1020 may include various sections (1022-1032) that permit a user to input any of several parameters for defining a prospective cell or redefining an existing one (either or both in a manner now to be better understood and appreciated), and even for running a simulation of one or more loss scenarios. In a map section 1022, the user may choose a specific geographical location at a desired level of granularity (e.g., via a clickable map and/or drop-down menus). A "litigation" section 1024 can accord a view of pending or historical litigation (e.g., related to property damage or a product recall). An "exposure" section 1025 can accord a choice of parameters such as a line of business, state or other location, building class code, peril etc. A "risk underwriting criteria" section 1026 can display all risk underwriting criteria that can be modified by the user for choosing or simulating purposes. A "claims" section 1028 can accord a view of different data such as claims reserve information, paid claims, and real time summaries, with an ability to focus in on specific claims (relating to a policy or policy portion). In a simulation section 1030, the user can select any of a variety of simulated loss scenarios (e.g., hurricane or other major weather event, product recall, etc.) and view, as output, prospective aftereffects such as claims payments. Another section 1032 can be provided, e.g., with adjustable equalizer graphs, drop down menus or other adjustable elements, to allow a user to set specific quantitative parameters associated with any of the other sections, either in constructing a request for a desired product or for running a simulation.

In accordance with at least one embodiment of the invention, a user (such as an investor) can also employ a dashboard 1020 in a manner to effect ongoing management of a cell once it is created. In this manner, a "cell manager" (either an individual investor or any of one or more individuals designated to manage a cell on behalf of a group or LLC) can alter or re-designate any parameters such as those discussed hereinabove with respect to FIG. 10, by way of amending one or more desired products and/or appetite for risk associated with the cell. This can be done as frequently as allowed by the system (e.g., the system 918 in FIG. 9), which may correspond to an unlimited degree of variability, or a limited degree that is coded into the system (e.g., a predetermined maximum number of amendments per month). (It can also be appreciated that a system may also disallow any such changes at all for as long as a cell is owned and/or managed by an investor or user.)

In accordance with at least one embodiment of the invention, based on inputs entered or chosen at the dashboard 1020, a user or investor acting as a cell manager can proactively change risk criteria or underwriting guidelines contained (with respect to the cell) in the actual system (e.g., such as that indicated at 918 in FIG. 9) that serves to assimilate information and thereupon calculate cell parameters. In other words, the cell manager can select criteria, values and/or parameters as discussed hereinabove with respect to fields 1022-1030, either by way of newly establishing a cell or adjusting criteria, values and/or parameters with respect to an existing cell (to the extent permitted by the insurer, and at a timepoint where such adjustment may be permitted). This serves to communicate to a system (e.g., system 918 in FIG. 9) a demand that is then processed by the system and reconciled with other stored data in the system to establish or reestablish the operating parameters and guidelines that serve to define the cell.

Figure 11:
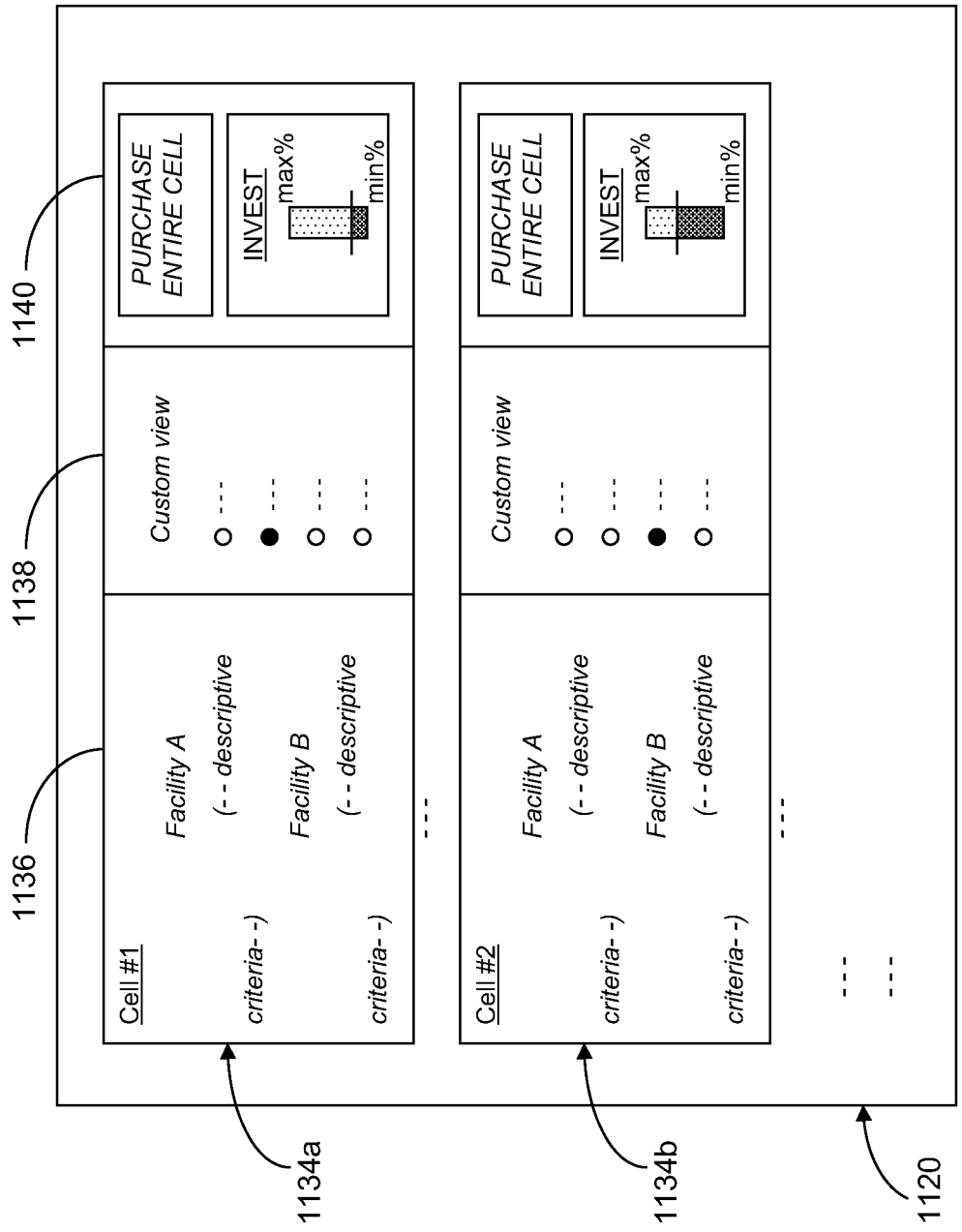
FIG. 11 schematically illustrates an example of a dashboard that may be made available to a potential buyer of, or investor in a cell.

FIG. 11 schematically illustrates an example of a trading platform dashboard 1120 (e.g., in the form of a GUI) that may be made available to a potential buyer of, or investor in a cell (such as one of those cells indicated at 914a-h in FIG. 9), once a cell has already been established (e.g., via a method such as that illustrated in FIG. 9). As such, representations of one or more cells may be called up (here, two are shown at 1134a and 1134b). By way of an example, as shown with regard to the first cell representation 1134a, one field 1136 may contain a list of the one or more facilities associated with the cell, along with suitable descriptive criteria. In another field 1138, the user can choose a custom view for viewing descriptive criteria. Finally, in another field 1140, the user can choose whether to purchase the entire cell or to invest in a portion thereof, between minimum and maximum percentage limits as may be predetermined and/or as may be governed by any existing fractional ownership by one or more others.

Figure 12:
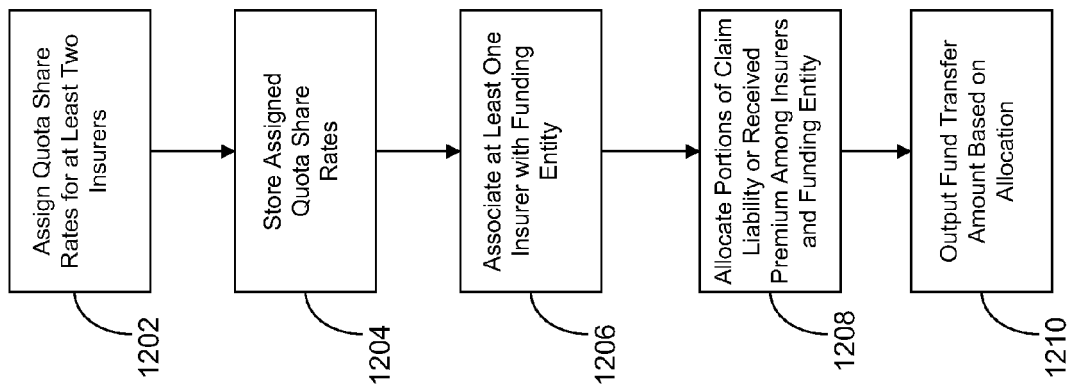
FIG. 12 is a flow chart of managing an insurance policy, according to at least one illustrative embodiment of the invention.

FIG. 12 broadly depicts a method of managing an insurance policy, according to at least one illustrative embodiment of the invention. As executed by a processor, quota share rates are assigned for at least two insurers (or insurance entities) to each of the respective insurance policies (1202). The assigned quota share rates are stored in a memory (1204), and at least one of the insurers (or insurance entities) is associated with a funding entity (1206). Portions of a claim liability or a received premium associated with at least one of the insurance policies are allocated among the at least two insurers (or insurance entities) and the funding entity according to the stored quota share rates associated with the at least one insurance policy (1208). A fund transfer amount is outputted based on the allocation (1210).

In accordance with at least one embodiment of the invention, it should generally be appreciated and understood that allocation guidelines can be applied to at least two insurers or at least two insurance entities, by way of allocating portions of a claim liability or a received premium associated with at least one insurance policy. An insurance entity can be broadly understood to represent a primary insurer, cell insurer or captive reinsurer as discussed hereinabove, or any insurance entity that is regulated or not in accordance with jurisdictional (e.g., state) guidelines. In at least one embodiment, the insurance entity can be a non-regulated administration system or management company that performs only selected insurance-related administrative functions, such as transferring insurance premiums and claim payments to and from cells. In a variant embodiment, two insurance entities, to which portions of a claim liability or received premium are allocated, may both be regulated entities.

The invention may be embodied in other specific forms without departing from the spirit or essential characteristics thereof. The forgoing embodiments are therefore to be considered in all respects illustrative, rather than limiting of the invention.

What is claimed is:

1. A data processing system for allocating one or more items associated with an insurance policy to multiple entities, said system comprising:
   a memory for storing data relating to allocation guidelines for at least two insurance entities in association with at least one insurance policy;
   a processor in communication with the memory configured for:
      allocating portions of a claim liability or a received premium associated with the at least one insurance policy among the at least two insurance entities according to the stored data relating to allocation guidelines;
      further allocating portions of a claim liability or a received premium associated with the at least one insurance policy to a funding entity associated with at least one of the insurance entities, the funding entity including one or more cell units; and
      outputting a fund transfer amount based on the allocation.

2. The data processing system of claim 1, wherein the one or more cell units comprise a plurality of cell units.

3. The data processing system of claim 2, wherein the funding entity comprises share portions each assuming separate liability.

4. The data processing system of claim 1, wherein:
   said memory is configured for storing quota share rates for at least two insurance entities in association with respective ones of a plurality of insurance policies;
   said processor is further configured for:
      assigning the quota share rates to each of the respective insurance policies;
      and
      allocating portions of a claim liability or a received premium associated with at least one of the insurance policies among the at least two insurance entities according to the stored quota share rates associated with the at least one of the insurance policies.

5. The data processing system of claim 1, wherein one of the at least two insurance entities is a captive reinsurer.

6. The data processing system of claim 1, wherein the processor is configured to allocate a portion of received premium among the at least two insurance entities and the funding entity.

7. The data processing system of claim 6, wherein, the fund transfer amount comprises a portion of the received premium to be transferred to the funding entity based on quota share rates associated with the at least one insurance policy.

8. The data processing system of claim 6, wherein the processor is configured to initiate a deposit into an account associated with the funding entity based on the fund transfer amount.

9. The data processing system of claim 1, wherein the processor is configured to generate a report to at least one of the insurance entities including a total of claim liabilities allocated to the at least one of the insurance entities according to the stored allocation guidelines.

10. The data processing system of claim 1, wherein the processor is configured to determine the allocation guidelines to assign to each of the respective insurance policies based at least in part on one of underwriting guidelines of each of a plurality of insurance entities, insurance capacity of each of the plurality of insurance entities, a length of time a respective insurance policy has been in force, and a length of time of a relationship among at least two of the plurality of insurance entities.

11. The data processing system of claim 1, wherein the processor is configured to allocate a portion of a claim liability among the at least two insurance entities and the funding entity.

12. The data processing system of claim 11, wherein the fund transfer amount comprises a portion of a claim liability allocated to the funding entity according to quota share rates associated with the at least one insurance policy.

13. The data processing system of claim 11, wherein:
   the one or more cell units comprise a plurality of cell units;
   the processor is configured to allocate portions of a claim liability associated with the at least one insurance policy among cell units in the funding entity; and
   the fund transfer amount comprises a portion of a claim liability allocated to the cell units according to the quota share rates associated with the at least one insurance policy.

14. The data processing system of claim 13, wherein the one or more cell units in the funding entity comprise share portions each assuming separate liability.

15. The data processing system of claim 11, wherein the processor is configured to initiate a payment from an account associated with one of the at least two insurance entities to a claimant based on the fund transfer amount.

16. The data processing system of claim 1, wherein the at least two insurance entities comprise at least two regulated insurers.

17. A data processing system associated with an insurance entity for allocating one or more items associated with an insurance policy to a funding entity for the insurance entity, said system comprising:
   a memory for storing data relating to allocation guidelines in association with at least one insurance policy;
   a processor in communication with the memory configured for:
      associating the insurance entity with the funding entity, the funding entity including one or more cell units;
      receiving an allocated portion of a claim liability or a received premium associated with the at least one insurance policy among the insurance entity and at least one other insurance entity;

allocating at least one portion of a claim liability or a received premium associated with the at least one insurance policy to the one or more cell units; and outputting a fund transfer amount based on the allocation.

18. The system according to claim 17, wherein the one or more cell units comprise a plurality of cell units.

19. The system of claim 18, wherein said processor is further configured for:

receiving a quota share rate for the insurance entity and the at least one other insurance entity in association with the at least one insurance policy;

establishing quota share rates for the cell units in association with the at least one insurance policy; and allocating portions of a claim liability or a received premium associated with the at least one of the insurance policy among the cell units according to the established quota share rates.

20. The data processing system of claim 18, wherein the processor is configured to allocate a portion of received premium among the cell units.

21. The data processing system of claim 18, wherein:

the processor is configured to allocate a portion of a claim liability among the insurance entity, the at least one other insurance entity and the funding entity; and the cell units in the funding entity comprise share portions each assuming separate liability.

22. The data processing system of claim 18, wherein at least one cell unit is established via input data from a user, the input data relating to at least one parameter for defining the at least one cell unit, the at least one parameter including a prospective claim liability.

23. A computerized method for allocating one or more items associated with an insurance policy to multiple entities, said method comprising:

storing, in memory, data relating to allocation guidelines for at least two insurance entities in association with at least one insurance policy;

allocating by a processor portions of a claim liability or a received premium associated with the at least one of the insurance policy among the at least two insurance entities according to the stored data relating to allocation guidelines;

further allocating by the processor portions of a claim liability or a received premium associated with at least one of the insurance policies to a funding entity associated with at least one of the insurance entities, the funding entity including one or more cell units; and outputting by the processor a fund transfer amount based on the allocation.

24. A computerized method for allocating one or more items associated with an insurance policy to a funding entity for an insurance entity, said method comprising:

storing, in memory, data relating to allocation guidelines in association with at least one insurance policy;

associating, by a processor, the insurance entity with the funding entity, the funding entity including one or more cell units;

receiving, by a processor, an allocated portion of a claim liability or a received premium associated with at least one of the insurance policies among the insurance entity and at least one other insurance entity;

allocating by a processor at least one portion of a claim liability or a received premium associated with the at least one insurance policy to the one or more cell units; and outputting by a processor a fund transfer amount based on the allocation.

25. The method of claim 24, further comprising availing a user an opportunity to purchase a desired investment share among the one or more cell units.

* * * * *